Sept. 12, 1944.  B. E. LUBOSHEZ  2,358,093
RANGE FINDER FOR CAMERAS
Filed May 25, 1943

BENJAMIN E. LUBOSHEZ
INVENTOR

BY
ATTORNEYS

Patented Sept. 12, 1944

2,358,093

UNITED STATES PATENT OFFICE 2,358,093

RANGE FINDER FOR CAMERAS

Benjamin E. Luboshez, Rochester, N. Y., assignor to Eastman Kodak Company, Rochester, N. Y., a corporation of New Jersey Application May 25, 1943, Serial No. 488,333

10 Claims. (Cl. 95—44)

This invention relates to range finders particularly designed for photographic purposes. One object of my invention is to provide a range finder which is particularly suitable for long, relatively thin cameras. Another object of my invention is to provide an extremely simple type of range finder in which there are no pivoted parts. Another object of my invention is to provide a range finder which can be readily intergeared with a camera focusing mechanism, and a still further object of my invention is to provide a range finder which is extremely simple to build, assemble and use. Other objects will appear from the following specification, the novel features being particularly pointed out in the claims at the end thereof. It has been customary in manufacturing range finders to provide a design in which one or more elements are pivotally mounted and moved during the focusing operation. One of the reasons for the cost of this type range finder is that the two reflecting elements, one of which is practically always pivoted have to be made and assembled with extreme accuracy to produce good results. It is, of course, desirable to have as much space as possible between the reflectors or other members forming the base of the range finder and, ordinarily, where the width between the base members is reduced, it is much more difficult to obtain an accurate and sensitive range finder.

In my copending application, Serial No. 487,914 for Inexpensive range finder, filed May 21, 1943, I have shown a range finder which avoids many of the objections to those before known and which, I believe, is about the simplest form that a range finder can take. My present invention is for a variation of this range finder since, like it, it utilizes a refracting material. Unlike my application referred to above, the range finder of this application is particularly suited to long, thin or narrow cameras, and it is particularly suited to such cameras employing focusing lenses because it is an extremely simple matter to intergear the camera objective with the range finder so that both will be simultaneously focused.

Coming now to the drawing wherein like reference characters denote like parts throughout:

My invention comprises broadly providing a range finder of light refractive material, the base of the range finder being formed by spaced and angularly disposed plane refracting surfaces so positioned that an image being focused upon may be registered on a split field also formed by a pair of crossed and plane refracting surfaces. If the images do not appear registered, one or more refracting surfaces are moved, thereby changing the angular relation of such refracting surfaces to the refracting surfaces forming the split field.

Figure 1:
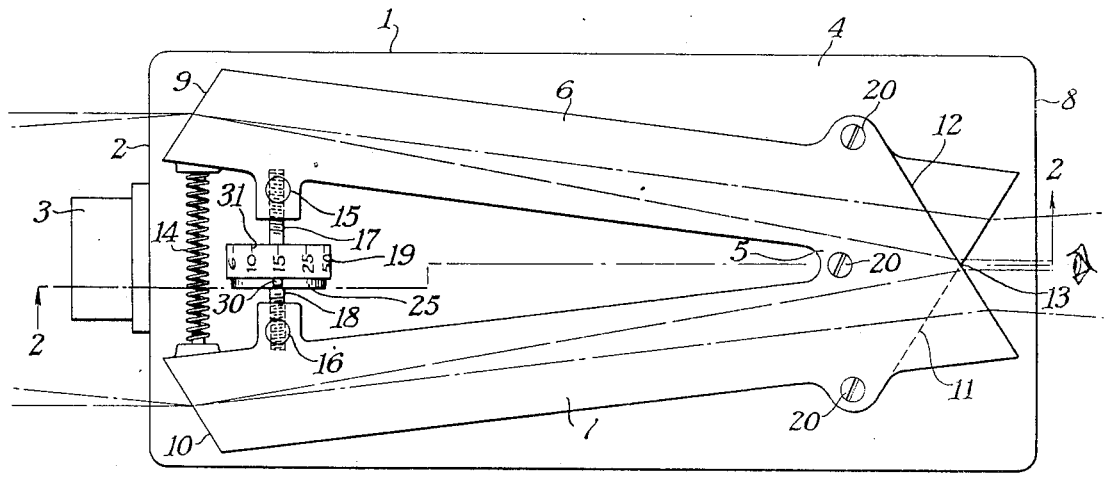
Fig. 1 is a top plan view of a typical long, narrow motion picture camera equipped with a range finder constructed with and embodying a preferred form of my invention. The casing surrounding the range finder has been removed.

More specifically, I may provide a range finder for a long, relatively narrow camera as shown in Fig. 1. In this figure the camera body 1 is elongated in shape and has a front wall 2 supporting a focusing objective 3. On the camera top wall 4 I provide a range finder which may consist of a single block 5 of light refracting material, such as glass or a clear plastic. The block 5 constitutes a prism which is roughly V-shaped, there being a pair of arms 6 and 7 converging from the front wall 2 toward the rear wall 8. On the front ends of the arms 6 and 7 there are light refracting surfaces 9 and 10, and on the rear wall of the prism there are light refracting surfaces 11 and 12. The normal position of these surfaces is such that an image being focused upon at infinity is brought into registration on the split field 13 formed by the refracting surfaces 11 and 12. The refracting surfaces 9 and 11 are preferably in a normal parallel relation and the refracting surfaces 10 and 12 are normally parallel. When parallel, objects at infinity as viewed in the split field 13 will be in registration.

If desired, a spring 14 may tend to move the arms 6 and 7 of the prism apart, but movement is controlled by means of metal pins or inserts 15 and 16 which include right and left-hand nuts into which the right and left-hand screws 17 and 18 pass, so that when the knob 19 is turned the arms 6 and 7 may be brought closer together or farther apart, thus altering the angular relationship between the refracting surfaces 10 and 9 and their relation to the refracting surfaces 11 and 12.

I prefer to fasten the prism on the camera top at its rear end only and this may be done by means of screws 20. Thus, while the back portion of the prism is firmly anchored against movement, it permits the long, forwardly extending arms 6 and 7 to flex the slight distance required for focusing. It should be remembered that where a mirror is rotated through an angle the reflected ray is rotated through twice that angle, whereas where a refracting surface is rotated through an angle the refracted ray is rotated through, not a larger, but a much smaller angle which depends on the material used and the original angle involved. Thus, a range finder of the type which I have described above is very much more sensitive than the more usual type in which a mirror or 45° prism is mounted.

Figure 2:
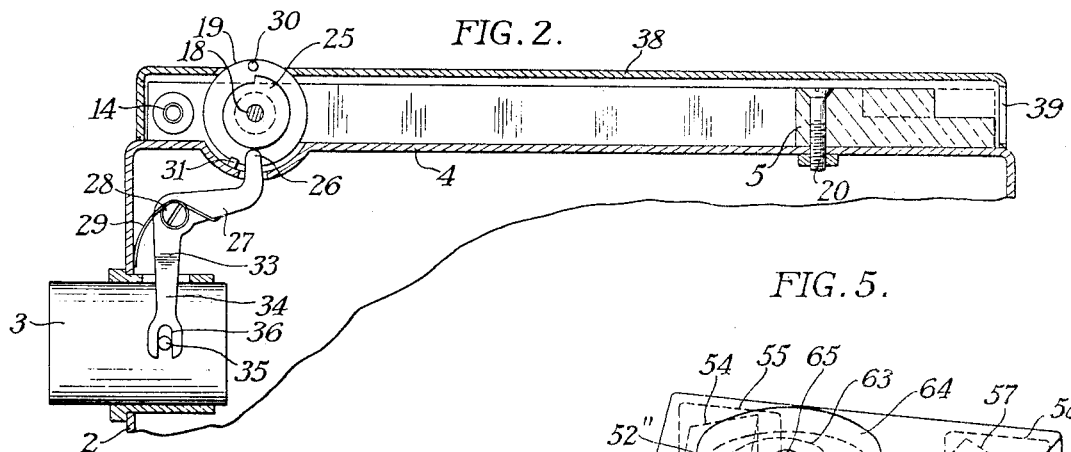
Fig. 2 is a section taken on line 2—2 of Fig. 1.

It is a simple matter to connect up my improved range finder so that it will focus the camera objective as it brings an image being focused upon into registration at the split field. This may be done by adding a cam 25 to the knob 19, this cam, as indicated in Fig. 2, lying in the path of an arm 26 of a bell crank lever 27 pivoted at 28 to the camera body and normally turned against the cam by means of a spring 29. The knob 19 may be provided with an inwardly extending pin 30 adapted to strike a pin 31 on the top wall 4 of the camera to prevent the knob from being turned beyond a predetermined amount in a counter-clockwise direction. the pin 30, by striking the arm 26, preventing too great rotation of the knob in an opposite direction.

Figure 3:
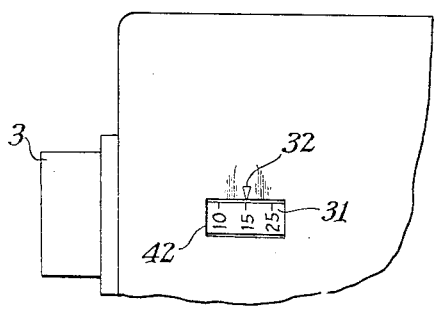
Fig. 3 is a fragmentary sectional plan view showing the focusing knob and scale as it would appear when the range finder casing is in place.

The knob 19 preferably carries a scale 31 graduated into units of distance so that this scale 31 may, as indicated in Fig. 3, indicate when brought opposite to a pointer 32, the focal setting of the camera and range finder.

As also indicated in Fig. 2, the bellcrank lever 27 is provided with a downwardly extending arm 33 which is bifurcated so that the two ends 34 project downwardly on each side of the camera objective 3 so that they may have a pin 35 and slot 36 connection therewith. When the knob 19 is rotated it is obvious that the cam 25 through the bellcrank lever 27 will focus the objective 3.

Figure 4:
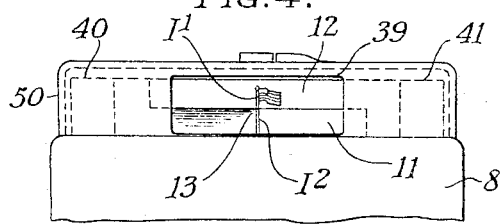
Fig. 4 is a rear view of a range finder showing an image of an object which has been correctly focused.

As indicated in Fig. 2, the prism 5 may be completely covered by a casing or housing 38 which is provided with a rear sighting window 39 opposite the split field 13, as indicated in Fig. 4, and there may be spaced windows 40 and 41 in the front wall of the casing opposite the light refracting surfaces 9 and 10. The casing is also provided with a window 42 over the knob 19 so that a portion of the knob and the focusing scale projects from the casing for the focusing operation and for determining the focal setting.

Figure 5:
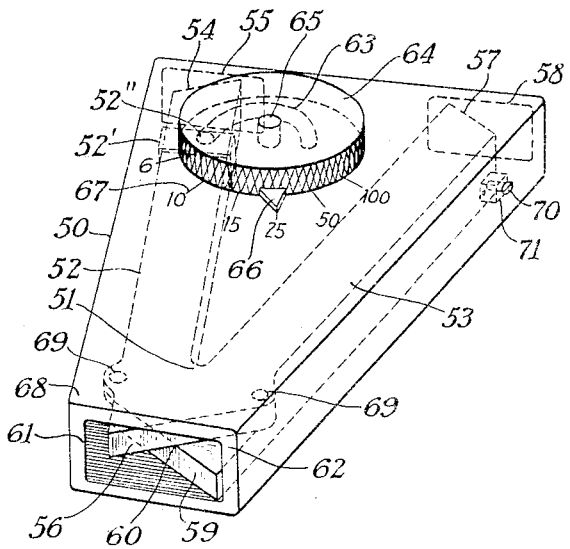
Fig. 5 shows a second embodiment of my invention in the form of a pocket range finder.

It is not necessary to move both of the light refracting surfaces 9 and 10 in focusing this type of range finder and, if desired, only one arm may be moved during the focusing operation. Such a construction is shown in the modification of my invention shown in Fig. 5. This figure illustrates a pocket type of range finder which may consist of a casing 50 enclosing a prism 51 having a pair of resilient arms 52 and 53. Arm 52 is provided with an outer light refracting surface 54 behind a window 55 and parallel to a light refracting surface 56 upon the rear of the prism. Arm 53 has a light refracting surface 57 behind the window 58 and parallel to the light refracting surface 59. The two light refracting surfaces 56 and 59 constitute a split field 60 which may be viewed through the window 61 in the rear wall 62 of the casing.

In this instance the focusing may be accomplished by moving only one arm, arm 52 being here selected. This arm is provided with a strap 52' passing about the arm from which a pin 52'' extends upwardly into a cam slot 63 carried by the knob 64 mounted to turn on the casing upon a post or stud 65. The knob 64 is provided with a pointer 66 which may indicate on scale graduations 67 the focal setting.

Like the first form of my invention, this range finder is exceedingly simple to use and is, at the same time, accurate. Since the rear end 68 of the range finder is anchored, as by screws or other fastening 69 to the casing, when the knob 64 is turned the light refracting surface 54 will move and thereby cause the image of an object being focused upon to come into registration in the split field 60 when the knob has been turned to the proper focal adjustment. It will be noted in this form of my invention that the arm 53 is fixedly mounted as by a screw 70 passing into a protuberance 71.

It is obvious that, while my refracting adjustable range finder is extremely suitable for long narrow cameras, I am not confined to a range finder which can only be used on such cameras. The dimensions are merely a matter of selection and may be altered to produce a range finder suitable for a camera of almost any dimension. The reason why I have particularly pointed out its usefulness in connection with a long narrow camera is that it is usually necessary with known types of range finders for such cameras to require a number of lenses to relay the images formed by the base reflectors near the front of such a camera to the rear of such a camera. Thus, range finders for long narrow cameras have ordinarily been even more expensive than range finders for cameras which are more nearly square or of dimensions more suitable for the usual range finder construction.

While I prefer to form my range finder prism of a single block of clear plastic material, because I have found that such construction is the most inexpensive, nevertheless I may utilize two or more pieces of material in making up the prism. For instance, if the prism is to be made of glass, it is usually desirable to have the arms 6 and 7 relatively thin and consequently I prefer to make the arms 6 and 7 separate pieces of glass, the thickness of the refracting surfaces 11 and 12. When so made the parallel surfaces 10 and 12 on one piece can be readily and accurately made parallel if necessary by suitable grinding and polishing operations. The opposite piece with the parallel surfaces 9 and 11 will be the same shape as the first-mentioned piece and the two pieces after reversing one of them may be either cemented together or merely fastened in place as by the three screws 20 shown in Fig. 1.

Regardless of how the prism is made and of what it is constructed, it is of course necessary that at least one of the arms of the prism be sufficiently resilient to be sprung the small amount necessary for focusing on near-by objects. With glass the arms 6 and 7 will always return to their normal position, but I prefer, particularly when the arms of the prism are made of plastic, that a spring 14 be utilized as shown in Fig. 1 which will always tend to create an outward pressure upon the two arms so that it is not necessary to rely solely on the resilience of the material to return the refracting surfaces 9 and 10 to their normal position of rest. Of course, the right and left-hand screw construction shown will hold the arms in any set position, but with either plastic or glass there is a tendency for the arms to return to their original rest position, which is usually one in which the surfaces 9 and 11 and the surfaces 10 and 12 are all parallel in which position objects at infinity will be brought into registration as indicated in Fig. 4.

In this figure the image consists of the sections $I^1$ and $I^2$, one image appearing on the refractive face 11 and the other on the refractive face 12. Thus, the split field 13 permits the images $I^1$ and $I^2$ to appear as a single continuous image. However, if the flagpole should be moved to a different position relative to the camera, the image $I^1$ would be offset from the image $I^2$. The operator noticing that the image focused upon was not in focus would then turn the dial 19 until the images $I^1$ and $I^2$ came into registration as shown in Fig. 4.

I claim:

1. A range finder for photographic purposes, including, in combination, a prism made of material capable of flexing, a pair of diverging arms on the prism, a split field on the prism formed by light refracting surfaces angularly arranged with respect to each other, one above the other, light refracting surfaces on the ends of the arms and normally parallel to one of the light refracting surfaces of the split field, a support carrying the prism, and means movably mounted on the support and engaging a prism arm for deflecting the prism arm, whereby the relative position of images in the split field may be altered.

2. A range finder for photographic purposes, including, in combination, a prism made of material capable of flexing, a pair of diverging arms on the prism, a split field on the prism formed by light refracting surfaces angularly arranged with respect to each other, one above the other, light refracting surfaces on the ends of the arms and normally parallel to one of the light refracting surfaces of the split field, a support carrying the prism, and means movably mounted on the support and engaging the prism arms for simultaneously flexing both arms and thereby deflecting light rays passing to the split field.

3. A range finder for photographic purposes, including, in combination, a prism made of material capable of flexing, a pair of diverging arms on the prism, a split field on the prism formed by light refracting surfaces angularly arranged with respect to each other, one above the other, light refracting surfaces on the ends of the arms and normally parallel to one of the light refracting surfaces of the split field, a support carrying the prism, and a right and a left hand nut, one carried by each prism arm, a right and left hand screw, one engaging one nut and the other engaging the other nut, and means for moving the screws.

4. A range finder for photographic cameras having objectives including, in combination, a prism having a pair of diverging arms, a first pair of light refracting surfaces on the ends of the arms, a second pair of light refracting surfaces on the opposite ends of said arms one normally parallel to the light refracting surface on the end of one arm and the other normally parallel to the light refracting surface on the end of the other arm, the second mentioned pair of light refracting surfaces lying at least partially one above the other and forming a split field, said prism arms being made of a material capable of flexing, and means for flexing an arm of the prism relatively to the split field thereof.

5. A range finder for photographic cameras having objectives including, in combination, a prism having a pair of diverging arms, a first pair of light refracting surfaces on the ends of the arms, a second pair of light refracting surfaces on the opposite ends of said arms one normally parallel to the light refracting surface on the end of one arm and the other normally parallel to the light refracting surface on the end of the other arm, the second mentioned pair of light refracting surfaces lying at least partially one above the other and forming a split field, said prism arms being made of a material capable of flexing, and means for flexing an arm of the prism relatively to the split field thereof, said means including operable mechanism connecting said means and the camera objective for focusing the objective with the range finder.

6. A range finder for photographic cameras having objectives including, in combination, a prism having a pair of diverging arms, a first pair of light refracting surfaces on the ends of the arms, a second pair of light refracting surfaces on the opposite ends of said arms one normally parallel to the light refracting surface on the end of one arm and the other normally parallel to the light refracting surface on the end of the other arm, the second mentioned pair of light refracting surfaces lying at least partially one above the other and forming a split field, said prism arms being made of a material capable of flexing, and means for flexing an arm of the prism relatively to the split field thereof, said means comprising a movable adjusting knob and a cam and lever mechanism connecting the camera objective and knob for moving the former from the latter.

7. A range finder for long narrow motion picture cameras having front and rear walls and comprising, in combination, a prism, a split field on the prism including a pair of flat angularly disposed light refracting surfaces arranged one above the other in crossed relationship and positioned near the rear wall of the camera, a pair of diverging arms extending from the split field forwardly toward the front wall of the camera, a light refracting surface on the end of each arm, one angularly disposed light refracting surface of the split field normally lying parallel to one light refracting surface on the end of one arm, the other light refractive surface of the split field normally lying parallel to the light refractive surface on the end of the other arm, and means for varying the angular relation of at least one light refractive surface relative to the others for varying the relationship of images passing through the light refracting surfaces and viewable in the split field.

8. A range finder for long narrow motion picture cameras having front and rear walls and comprising, in combination, a prism, a split field on the prism including a pair of flat angularly disposed light refracting surfaces arranged one above the other in crossed relationship and positioned near the rear wall of the camera, a pair of diverging arms extending from the split field forwardly toward the front wall of the camera, a light refracting surface on the end of each arm, one angularly disposed light refracting surface of the split field normally lying parallel to one light refracting surface on the end of one arm, the other light refractive surface of the split field normally lying parallel to the light refractive surface on the end of the other arm, and means for varying the angular relation of the two arms relative to the split field for registering images of an object focused upon therein.

9. A range finder for long narrow motion picture cameras having front and rear walls and comprising, in combination, a prism, a split field on the prism including a pair of flat angularly disposed light refracting surfaces arranged one above the other in crossed relationship and positioned near the rear wall of the camera, a pair of diverging arms extending from the split field forwardly toward the front wall of the camera, a light refracting surface on the end of each arm, one angularly disposed light refracting surface of the split field normally lying parallel to one light refracting surface on the end of one arm, the other light refractive surface of the split field normally lying parallel to the light refractive surface on the end of the other arm, and means for varying the angular relation of at least one light refractive surface relative to the other and including an adjustable member directly engaging a prism arm, a mount for the adjustable member on the camera body, a movably mounted lens carried by the camera, mechanism movable by the adjustable member and operatively engaging the moveably mounted lens carried by the camera body for adjusting the lens with the light refracting surface.

10. A range finder for long narrow motion picture cameras having front and rear walls and comprising, in combination, a prism, a split field on the prism including a pair of flat angularly disposed light refracting surfaces arranged one above the other in crossed relationship and positioned near the rear wall of the camera, a pair of diverging arms extending from the split field forwardly toward the front wall of the camera, a light refracting surface on the end of each arm, one angularly disposed light refracting surface of the split field normally lying parallel to one light refracting surface on the end of one arm, the other light refractive surface of the split field normally lying parallel to the light refractive surface on the end of the other arm, and means for varying the angular relation of the two arms relative to the split field for registering images of an object focused upon therein, said means including a movable knob, a cam carried thereby, a pivoted lever engaging the cam, a focusing lens also engaged by the lever whereby movement of the movable knob may simultaneously focus the camera and range finder.

BENJAMIN E. LUBOSHEZ.